Patented Sept. 12, 1950

2,522,355

UNITED STATES PATENT OFFICE 2,522,355

THIOPHENE CONDENSATION PRODUCTS

Charles F. Feasley, Woodbury, N. J., assignor to Socony-Vacuum Oil Company, Incorporated, a corporation of New York No Drawing. Application September 24, 1945, Serial No. 618,412

8 Claims. (Cl. 260—43)

The present invention relates to thiophene condensation products and, more particularly, to a process for producing resinous mass from thiophene and to the novel products of the aforesaid process.

The prior art provides many disclosures of methods of producing resinous masses from aromatic hydrocarbons and aldehydes and from phenols and aldehydes. All of these methods involve the use of either an acid or an alkaline catalyst or condensing agent. Therefore, whether thiophene be considered similar to benzene or similar to phenol in its reactions with aldehydes or carbonyl compounds, it might be assumed that either acid or alkaline catalysts would be necessary to produce satisfactory results. However, it now has been discovered that very satisfactory resins can be produced by the reaction between thiophene and a compound having a carbonyl group, particularly an aldehyde, employing a solid adsorbent contact mass, preferably in finely-divided form, as the catalyst or condensation agent.

It is an object of this invention to provide a process for producing resinous bodies from thiophene employing solid adsorbent contact material as the condensation agent. It is another object of the present invention to provide a process for producing resinous bodies from thiophene and an aldehyde employing clay of the montmorillonite type as catalyst. It is a further object of the present invention to provide a process for producing resinous bodies from thiophene and an aldehyde employing as condensation agent or catalyst natural or synthetic materials comprising silica as a major component and containing about 7 per cent to about 15 per cent alumina. It is also an object of this invention to provide resinous masses produced from thiophene and an aldehyde containing filler incorporated with the resin at the time of condensation. Other objects and advantages will become apparent from the following description.

In general, the novel resins of the present invention are produced by reacting thiophene and a carbonyl compound at moderately elevated temperatures in the presence of solid adsorbent contact mass, preferably in finely-divided or powder form until the thiophene and carbonyl compound condense to form a resinous mass or body. The resinous mass so obtained containing the solid adsorbent contact mass resists solution in most organic solvents including benzol, acetone, "Sovasol" #75 and the like. Thus, an inexpensive catalyst or condensing agent also serves as a satisfactory filler.

The thiophene and carbonyl compound can be reacted in various proportions. However, it is preferred to employ an excess of carbonyl compound and particularly such amounts of carbonyl compound and thiophene as to provide molal proportions greater than 1, such as, for example, 2 or 3 moles of carbonyl compound to one mole of thiophene. However, formaldehyde in any of its various forms and thiophene may be reacted in molal proportions of thiophene to aldehyde of 1:1, 5:4 to 5:2. Various aldehydes, such as the aliphatic aldehydes, acetaldehyde, propionaldehyde, butyraldehyde, and aromatic aldehydes such as benzaldehyde may be used in addition to formaldehyde.

The condensing agent or catalyst or promoter is generally a solid adsorbent contact mass preferably in finely-divided or powder form. Among the materials included in this category are, for example, clays of the montmorillonite type, particularly those which have been activated by the well-known acid treatment to a composition approximating $Al_2Si_4O_{10}(OH)_2.nH_2O$ and available to industry under the trade name "Super Filtrol." As those skilled in the art know, "Super Filtrol" is a non-swelling (crystalline rather than amorphous) bentonite clay of the montmorillonite type which has been activated by an acid treatment to give a composition approaching $Al_2Si_4O_{10}(OH)_2.nH_2O$. Other members of the group, solid adsorbent contact mass, are fresh burnt Attapulgus clay, silica gel, synthetic alumina-silica gel containing about 7 per cent to about 15 per cent alumina and base exchange alumina-silica gels employed in catalytic cracking and known to industry as "Bead" catalyst.

The condensation of the thiophene and the carbonyl compound is carried out preferably in a closed container at about 250° F. to about 350° F. under autogenous pressure, the time required being about 5 to about 6 hours.

The following description of a particular operation is illustrative of preferred conditions within the broad range of possible conditions including ratio of thiophene to carbonyl compound, temperature, pressure and reaction time.

Example I

A 600 cubic centimeter stainless steel autoclave was charged with 209 grams (2.49 moles) of thiophene, 75 grams of thioxymethylene (equivalent to 2.5 moles of formaldehyde) and 35 grams of "Super Filtrol." It will be noted that the thiophene and carbonyl compound were used in a molal ratio of 1:1.

The reaction mixture was shaken and heated to 290° F. and held at that temperature for 5.5 hours. During that time the pressure reached a maximum of 103 pounds per square inch but decreased somewhat as the reaction proceeded.

At the end of the aforesaid reaction period the contents of the autoclave were washed with "Sovasol" #75 (an aromatic petroleum stock containing about 60 per cent aromatics mostly polymethyl benzenes) to remove unreacted thiophene and oil soluble resinous materials. It is to be noted that no unreacted thiophene was recovered from the "Sovasol" extract although 10 grams of reddish oil boiling above 205° C. at atmospheric pressure was obtained. The resinous product admixed with the clay catalyst contained 17.53 per cent sulfur.

*Example II*

Thiophene (100 grams of 1.19 moles), 200 cubic centimeters of Stoddard Solvent, 60 grams of trioxymethylene (equivalent to 2 moles of formaldehyde), and 18 grams (5 percent by weight) of "Super Filtrol" clay were stirred together at atmospheric pressure for 27 hours at 75° C. to 80° C. At the end of that time the reaction mixture was filtered, and the solids washed with additional Stoddard Solvent and finally with water. The solids after air drying weighed 64 grams and still contained the clay catalyst. The filtrate was topped to give in addition to a low-boiling distillate only 2 grams of a reddish-brown product which did not solidify. Most of the converted product, therefore, was solvent insoluble.

*Example III*

"Sovasol" #75 (75 per cent overhead) (400 grams), 42 grams (0.5 mole) of thiophene, 60 grams of trioxymethylene, and 90 grams of "Super Filtrol" clay were heated and stirred together at the reflux temperature for 6 hours. At the end of this time the clay was removed by filtration and washed with "Sovasol" #75. The clay after drying weighed 120 grams and had the general appearance of containing a brown resin. Eight grams of light yellow distillate came over in the range 200° C. at 760 millimeters to 280° C. at 7 millimeters (or 200° C. to 460° C. calculated to 760 millimeters) leaving a tacky brown solid residue containing sulfur. It would appear in this case that both solvent-soluble and solvent-insoluble resins were formed by interaction of "Sovasol" #75 (75 per cent overhead), trioxymethylene and thiophene.

*Example IV*

"Sovasol" #75 (75 per cent overhead) (400 grams), 60 grams of trioxymethylene and 90 grams of "Super Filtrol" clay were stirred together at 100° C. at atmospheric pressure while 42 grams (0.5 mole) of thiophene was introduced in 3½ hours. The reaction mixture was stirred at 110° C. for an additional 2½ hours after the last thiophene introduction.

The solids were removed by filtration and washed with "Sovasol" #75. The clay showed a gain in weight of 15 grams indicating very little solvent-insoluble material. In addition, to recovered "Sovasol" #75 (75 per cent overhead), a fraction (31 grams), boiling 200° C. at 760 millimeters—300° C. at 10 millimeters (or 200° C. to 475° C. calculated to 760 millimeters), which was a light yellow slightly viscous oil containing 0.8 per cent sulfur, was obtained. The solid residue, which was a light amber brittle resin, weighed 60 grams (13.6 per cent conversion based on total weight of "Sovasol" #75 (75 per cent overhead) and thiophene) and contained 2.2 per cent sulfur.

The usual resin from "Sovasol" #75 (75 per cent overhead) and formaldehyde prepared under similar conditions has about 5

$$(—(CH_3)_3C_6H\ CH_2—)$$

units. Should one of these 5 units be replaced by a group containing the thiophene unit the calculated per cent sulfur would be 5.34 per cent sulfur. Contamination of this product with some of the straight "Sovasol" #75 (75 per cent overhead) formaldehyde resin would give the results as found.

*Example V*

Phenol (50 grams or 0.532 mole), 75 grams of thiophene, 60 grams of trioxymethylene, and 10 grams of "Super Filtrol" clay were stirred and heated at atmospheric pressure for 22¼ hours at 75° C. to 80° C.

The reaction mixture was filtered to remove solids and to give 10 grams of a viscous oil filtrate. The solids were washed with large quantities of water and dried. When dry the solids weighed 60 grams. After a benzol wash the weight of the solids had been reduced to 35.5 grams indicating the presence of solvent-soluble material. This would indicate the possibility of having 25.5 grams of solvent insoluble resins held in the clay.

I claim:

1. The method of preparing synthetic products which comprises reacting thiophene with an aldehyde in the molal ratio of 1:1 to 4 at temperatures of about 165° to about 350° F. in the presence of solid adsorbent contact material suitable for catalyzing the cracking of petroleum hydrocarbons selected from the group consisting of activated clay, fresh burnt Attapulgus clay, silica gel, synthetic alumina-silica gel containing about seven per cent to about fifteen per cent alumina and base exchange alumina-silica gels as the sole essential condensing agent.

2. The method of preparing synthetic products as described and set forth in claim 1 in which phenol is added to the reaction mixture.

3. The method of preparing synthetic products as described and set forth in claim 1 in which aromatic hydrocarbon is added to the reaction mixture.

4. The method of preparing synthetic products which comprises reacting thiophene and formaldehyde in the molal ratio of 1:1 at temperatures of about 165° to about 350° F. in the presence of solid adsorbent contact material suitable for catalyzing the cracking of petroleum hydrocarbons selected from the group consisting of activated clay, fresh burnt Attapulgus clay, silica gel, synthetic alumina-silica gel containing about seven per cent to about fifteen per cent alumina and base-exchange alumina-silica gels as the sole essential condensing agent.

5. The method of preparing synthetic products which comprises reacting thiophene and formaldehyde in the molal ratio of 1:1 to 4 in the presence of phenol and as the sole essential catalyst solid adsorbent contact material suitable for catalyzing the cracking of petroleum hydrocarbons selected from the group consisting of activated clay, fresh burnt Attapulgus clay silica gel, synthetic alumina-silica gel containing about seven per cent to about fifteen per cent alumina and base-exchange alumina-silica gels at temperatures of about 165° to about 350° F.

6. The method of preparing synthetic products as described and set forth in claim 5 in which the thiophene to formaldehyde molal ratio is 0.9:2.

7. The method of preparing synthetic products which comprises reacting thiophene and formaldehyde in the molal ratio of 1:1 to 4 at temperatures of about 165° to about 350° F. in the presence of aromatic hydrocarbon and as the sole essential catalyst solid adsorbent contact material suitable for catalyzing the cracking of petroleum hydrocarbons selected from the group consisting of activated clay, fresh burnt Attapulgus clay, silica gel, synthetic alumina-silica gel containing about seven per cent to about 15 per cent alumina and base-exchange alumina-silica gels.

8. The method of preparing synthetic products as described and set forth in claim 7 wherein the reaction temperature is about 212° F. to the reflux temperature of the reaction mixture.

CHARLES F. FEASLEY.

REFERENCES CITED

The following references are of record in the file of this patent:

UNITED STATES PATENTS

| Number | Name | Date |
|---|---|---|
| 2,114,121 | Bender | Apr. 12, 1938 |
| 2,200,763 | Anderson | May 14, 1940 |
| 2,384,505 | Thomas | Sept. 11, 1945 |
| 2,391,050 | Horn | Dec. 18, 1945 |
| 2,453,085 | Caesar | Nov. 2, 1948 |

FOREIGN PATENTS

| Number | Country | Date |
|---|---|---|
| 109,201 | Australia | Apr. 11, 1940 |